(12) United States Patent
Biester et al.

(10) Patent No.: US 8,274,245 B2
(45) Date of Patent: Sep. 25, 2012

(54) ACTUATING DEVICE AND METHOD OF OPERATING AN ACTUATING DEVICE

(75) Inventors: Klaus Biester, Wienhausen (DE); Peter Kunow, Berlin (DE); Norbert Lenz, Celle (DE)

(73) Assignee: Cameron International Corporation, Houston, TX (US)

( * ) Notice: Subject to any disclaimer, the term of this patent is extended or adjusted under 35 U.S.C. 154(b) by 527 days.

(21) Appl. No.: 12/595,717

(22) PCT Filed: Apr. 13, 2007

(86) PCT No.: PCT/EP2007/003307
§ 371 (c)(1),
(2), (4) Date: Oct. 13, 2009

(87) PCT Pub. No.: WO2008/125136
PCT Pub. Date: Oct. 23, 2008

(65) Prior Publication Data
US 2010/0127646 A1   May 27, 2010

(51) Int. Cl.
*H02P 3/10* (2006.01)
*H02P 3/20* (2006.01)
(52) U.S. Cl. ......... 318/373; 318/555; 175/170; 251/1.1; 251/1.2; 137/81.1; 137/81.2
(58) Field of Classification Search .................. 318/373, 318/555; 175/170; 251/1.1, 1.2; 137/81.1, 137/81.2
See application file for complete search history.

(56) References Cited

U.S. PATENT DOCUMENTS

| 5,394,288 | A | 2/1995 | Nishida et al. | |
| 6,806,595 | B2 * | 10/2004 | Quarre | 310/12.33 |
| 7,231,842 | B2 * | 6/2007 | Biester et al. | 74/89.25 |
| 7,615,893 | B2 * | 11/2009 | Biester et al. | 307/82 |

FOREIGN PATENT DOCUMENTS
DE    10134428 A1    1/2003

OTHER PUBLICATIONS

International Search Report and Written Opinion for Appl. No. PCT/EP2007/003307 dated May 22, 2008; (8 p.).

* cited by examiner

*Primary Examiner* — Lincoln Donovan
*Assistant Examiner* — Erick Glass
(74) *Attorney, Agent, or Firm* — Chamberlain Hrdlicka

(57) ABSTRACT

An actuating device for displacing a control device, such as a gate valve or other control mechanism, in particular for use in oil or gas production systems, includes a motor-gear unit and a threaded spindle drive, which is operable by said motor-gear unit. The threaded spindle drive includes at least a threaded spindle and a screw nut. The threaded spindle is displaceable in an essentially axial-direction so as to displace the control device between an advance position and a retracted position. The threaded spindle drive further includes a position holding means holding the attained position of the threaded spindle. The position holding means is directly connected to a motor shaft of the motor-gear unit so as to apply a holding torque to said motor shaft.

21 Claims, 3 Drawing Sheets

— ACTUATING DEVICE AND METHOD OF OPERATING AN ACTUATING DEVICE

CROSS-REFERENCE TO RELATED APPLICATION

The present Application claims priority to PCT/EP2007/003307 filed 13 Apr. 2007.

STATEMENT REGARDING FEDERALLY SPONSORED RESEARCH OR DEVELOPMENT

Not Applicable.

BACKGROUND

The present invention relates to an actuating device for displacing a control device. Such a control device is e.g. a valve, a gate valve, a so-called blow-out preventer or some other control mechanism used in the field of oil and natural gas production, in particular in the maritime sphere. Such a control device is provided with a suitable actuating element which is adapted to be displaced by the actuating device so as to displace e.g. a valve as a control device to the open or to the closed position.

The actuating device comprises at least a motor-gear unit and a thread drive, in particular roller bearing spindle drive, which is operable by said motor-gear unit and which comprises a threaded spindle and a screw nut. The screw nut is normally supported in the actuating device such that it is rotatable, but not displaceable in the axial direction, whereas the threaded spindle is adapted to be axially displaced by rotating the screw nut, so as to displace the control device between an advanced position and a retracted position. In addition, the actuating device comprises a position holding means holding the attained position of the threaded spindle. This position holding means especially prevents the threaded spindle from returning automatically from the attained position.

EP 1 281 111 B1 discloses such an actuating device and a method of operating said actuating device. The position holding means is defined by a loop spring or volute spring which is arranged between a connection sleeve and an annular shoulder of the actuating device. This loop spring allows, on the one hand, a rotation of the connection sleeve in the advance direction of the rotary spindle, whereas, on the other hand, a return torque applied to the rotary spindle by the control device is taken up by the volute spring. The threaded spindle can only be retracted from the attained position, when the respective loop spring has been released.

Furthermore, an additional volute spring is normally used, which is compressed while the threaded spindle is being displaced to the position to be attained and which will reset the control device to a safe position, especially if the power supply to the motor-gear unit should fail, such a safe position being, in the case of a valve, e.g. a closed position.

On the whole, the known actuating device is well adapted to be used, especially below the water surface, for control devices of the type in question, such as valves, flow control valves or the like, and, if respective components, such as the motor-gear unit, should fail, it also allows fault-proof operation.

SUMMARY OF THE PREFERRED EMBODIMENTS

The present invention simplifies the structural design and the operation of such an actuating device, whereby this actuating device will become less expensive and whereby the fault-proofness of the system in question will simultaneously be maintained.

Features of claims 1 and 12, respectively can facilitate such advantages for example.

According to the present invention, the position holding means is directly connected to a motor shaft of the motor-gear unit so as to apply a holding torque. Due to this direct connection, it is no longer necessary to arrange different sleeves, which are supported in the interior of the actuating device such that one of them is secured against rotation and that the other one is rotatable, the outer surfaces of said sleeves being interconnected by a suitable volute spring acting as a position holding means. The rotatable sleeve has, up to now, been rotatably connected to the motor-gear unit and the thread drive, respectively, the outer surfaces of this sleeve having arranged thereon a volute spring, which is implemented as a loop spring and which, unless released, prevents the threaded spindle from being moved away from the attained position.

Instead, the position holding means according to the present invention acts directly on the motor shaft and can be implemented in different ways so as to apply a sufficient holding torque.

One possibility of realizing such a position holding means is an electric motor of the motor-gear unit, operated with holding current. In this way, the electric motor which, in principle, displaces the threaded spindle via the gear mechanism and the screw nut is directly used as a position holding means. By means of the respective holding current, the electric motor holds the threaded spindle statically at its attained position.

Another possibility of realizing the position holding means according to the present invention is a stepping motor which is connected to the motor shaft in a motion-transmitting manner. Especially when the electric motor has been switched to the currentless state, the stepping motor will be able to hold the motor shaft and, consequently, the threaded spindle at the attained position, whereas, when current flows, it will also be able to displace the threaded spindle from said attained position to the advance position or the retracted position.

A simple possibility of establishing a motion-transmitting connection between the stepping motor and the motor shaft can be seen in a structural design in which the motor shaft has arranged thereon at least a first gear, which is in engagement with a second gear arranged on a stepping motor shaft. This allows the stepping motor and its motor shaft to be arranged in parallel spaced relationship with the motor shaft of the electric motor, whereby the space required within the actuating device will be comparatively small.

A further realization of a respective position holding means according to the present invention is a motor shaft blocking means, such as a lock, a brake or the like, which also acts directly on the motor shaft of the electric motor.

For operating such a motor shaft blocking means in a simple manner, said motor shaft blocking means can be electrically operable.

For displacing the threaded spindle from the attained position, the respective holding torque is reduced in accordance with the present invention, whereupon the threaded spindle and, consequently, the control device can be displaced by rotating the motor shaft, in particular actively through the electric motor. When the threaded spindle is acted upon by the control device in a suitable manner, it is also possible to reset, when the holding torque has been reduced, the threaded spindle from the attained position essentially by means of the control device. If the attained position is e.g. the advanced position, this resetting to the retracted position can be executed by applying a suitable pressure to the threaded spindle through the control device. If the attained position is, however, the retracted position, resetting to the advanced position can be effected by applying a suitable traction force to the threaded spindle through the control device.

In addition, it will be of advantage when, if necessary, the electric motor is adapted to be switched to the generator mode for generating power when the threaded spindle is reset from the attained position. The power generated can be used for operating other electric means of the actuating device or for power storage. One possibility of utilizing this power is that a signal can be transmitted to a remote station by the power generated by the electric motor in the generator mode. This will, of course, only be possible when at least one line leading to said remote station is still intact.

An operation of the electric motor in the generator mode has simultaneously the effect that the displacement speed of the threaded spindle will be reduced to an acceptable speed when the holding torque has been reduced.

The waste heat produced when said power is generated can be passed to the surroundings and especially to the water in the case of maritime actuating devices.

An advantageous embodiment of the electric motor can be seen in an implementation of said electric motor as a brushless dc motor. In this respect, it should additionally be taken into account that the electric motor can be comprises two or more individual motors for redundancy reasons.

Other than the actuating device provided with volute and loop springs, the actuating device according to the present invention is able to transmit pressure as well as traction forces. When the above-mentioned springs are used, the threaded spindle and, consequently, the control device can always be displaced in only one direction, i.e. the forces transmitted are especially pressure forces. The actuating device according to the present invention, which comprises neither any volute springs nor any loop springs, also offers the possibility of moving e.g. the threaded spindle from the advanced position to the retracted position, whereby a respective traction force will be applied to the control device. It goes without saying that it will also be possible to move the threaded spindle from the retracted position to the advanced position so as to transmit a suitable pressure force to the control device.

If the power supply of the actuating device according to the present invention should fail, automatic resetting from the attained position will take place, at least in cases in which the respective resetting force is applied by the control device. This applies e.g. to cases where a so-called gate valve is operated as a control device by the actuating device. In the case of such a gate valve, a valve slide will, in the field of crude oil production, be acted upon by the respective borehole pressure such that it will force the gate valve into the closed position and, consequently, the threaded spindle into the retracted position, against the ambient pressure that depends on the water depth in question. When the electric motor fails to operate, this resetting will take place e.g. in the generator mode of the electric motor so that the power generated in this mode can additionally be used for transmitting a respective emergency signal to the remote station. If, however, all the connection lines between the actuating device and the remote station should be interrupted, which corresponds to a complete interruption of the power supply to the actuating device, it will at least be possible to reset the threaded spindle to the retracted position in the case of suitable pressure conditions between the borehole pressure and the ambient pressure.

If the ambient pressure is, however, equal to or higher than the borehole pressure, the threaded spindle will not be reset in the case of such gate valves.

This applies especially to so-called stem balanced gate valves including a valve slide where the same forces act on both sides in the direction of displacement. The valve slide in question is not in contact with sea water, but is disposed in an oil-filled chamber, respective chambers on both sides of the valve slide being interconnected and pressure compensated. When used for such an arrangement, the actuating device according to the present invention only has to overcome frictional forces so that the power required will be reduced to a substantial extent. In the case of power failure or if other components, in particular the electric motor of the actuating device, should fail to operate, the threaded spindle will, however, remain at the attained position and automatic closing of the valve will not be possible.

BRIEF DESCRIPTION OF THE DRAWINGS

In the following, advantageous embodiments of the present invention will be explained in detail on the basis of the figures in the drawing, in which.

DETAILED DESCRIPTION OF THE PREFERRED EMBODIMENTS

Figure 1:
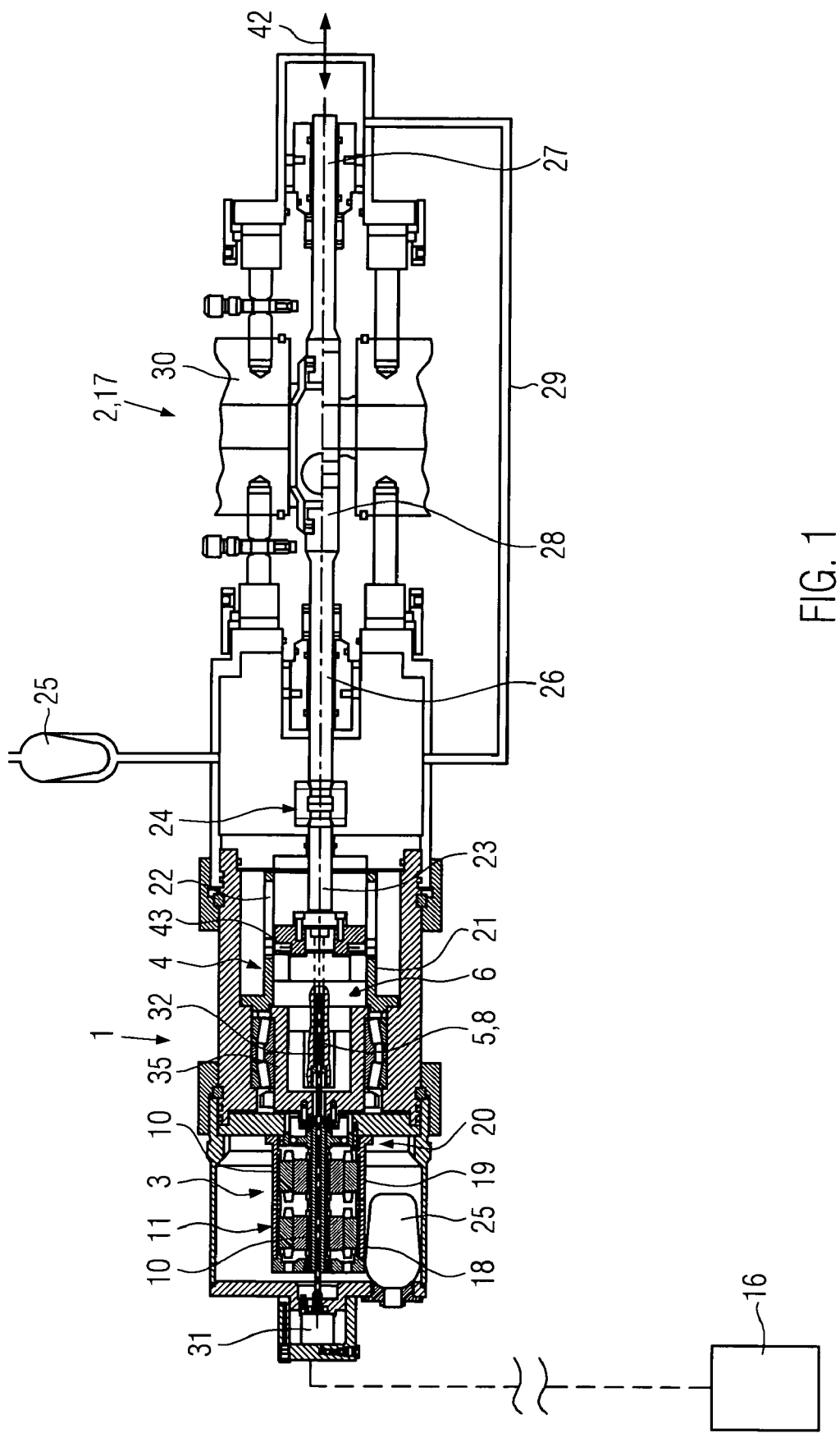
FIG. 1 shows a longitudinal section through a first embodiment of an actuating device according to the present invention including a so-called "stem balanced gate valve" as a control device.

FIG. 1 shows a longitudinal section through a first embodiment of an actuating device 1 which is laterally flanged onto a control device 2 in the form of a so-called "stem balanced gate valve". Such a stem balanced gate valve 17 serves as a control device 2 for controlling e.g. the flow of crude oil through a pipeline 30. The valve comprises a valve slide 28 which, in the direction of displacement, is connected to piston rods 26, 27 on both sides thereof. Each of these piston rods ends in a piston chamber filled with a hydraulic fluid. The respective piston chambers are interconnected by a pressure compensation line 29 for the purpose of pressure compensation. At least one of the piston chambers has associated therewith a compensator 25 with hydraulic fluid.

One of the piston rods 26 is, in the direction of displacement 42, connected to the actuating device 1 according to the present invention via a coupling element 24. Said actuating device 1 comprises two housing components 33 and 34, cf. also FIGS. 2 and 3. The housing component 34 located directly adjacent the control device 2 has arranged therein a thread drive 4 comprising at least a threaded spindle 5 and a screw nut 6. The screw nut 6 is supported in the housing and screw-fastened to the connection sleeve 35. The Sleeve 21 with the guide slot 22 serves as an anti-rotation unit for protecting the threaded spindle 5 against rotation and is fixed to housing component 34. The threaded spindle 5 extends through the screw nut 6. The end of the threaded spindle 5 facing the control device 2 can be formed with a threaded spindle extension 23 via a connection element 39. This threaded spindle extension 23 ends in the coupling element 24 and protrudes beyond the housing component 34.

The threaded spindle drive is a roller bearing spindle drive.

In FIG. 1 the threaded spindle 5 is arranged at a retracted position 8 at which said threaded spindle 5 is displaced to the left in FIG. 1 to the maximum possible extent.

The connection element 39 has on both sides thereof two radially outwardly projecting guide elements 43 which are adapted to be moved along guide slots 22 extending in the direction of displacement 42.

The screw nut 6 is rotatably connected to a connection sleeve 35, which, through suitable bearing means, is supported radially outwards in the housing component 34, such that it is rotatable. The connection sleeve 35 has its closed end, which is located opposite the screw nut 6, connected to a gear mechanism 20 of a motor-gear unit 3. This motor-gear unit is arranged within the housing component 33, cf. also FIG. 2.

The gear mechanism 20 is implemented as a so-called harmonic drive. It is, however, also possible to use some other gear mechanism, e.g. a planetary gear. A harmonic drive normally comprises three parts. A cylindrically deformable flexspline 37 is connected to the connection sleeve 35 such that it is secured against rotation relative thereto. A circular spline 38 is connected to the housing component 34 through a flange. The circular spline 38 is in engagement with the flexspline 37 via a few teeth. The inner circumference of the flexspline 37 is in contact with an elliptical disk or wave generator 36. The wave generator 36 is arranged on the motor shaft 10 such that it is secured against rotation relative thereto. The motor shaft 10 is adapted to be rotated by an electric motor 11, which comprises two individual electric motors 18 and 19 for redundancy reasons.

The individual electric motors 18, 19 are implemented as brushless dc motors. However, any suitable dc or ac motor is within the scope of the present invention.

A compensator 25 is arranged adjacent to at least one of the individual electric motors 18. The compensator is used for pressure compensation between the oil-filled actuating device 1 and the surroundings, i.e. the water. The magnitudes compensated are the hydrostatic pressure (water depth) as well as temperature and/or volume variations. (Compensator: sea water on one side, oil from the actuating device 1 on the other side). The compensator is not filled with oil, but open towards the sea water.

A sensor element 32 extends through the motor shaft 10 and up to and into the threaded spindle 5, said sensor element being connected to a position sensor 31 on one side thereof. The sensor element 32 serves to determine the position of the threaded spindle 5, when said threaded spindle is displaced between its retracted position 8 according to FIG. 1 and an advanced position 7, cf. also FIG. 2. The sensor element 32 is able to sample the interior of the threaded spindle 5 magnetically, electrically or in some other way, and to determine, through this sampling, the relative position between the sensor element 32 and the threaded spindle 5 by means of the position sensor 31.

The information associated with the respective position as well as additional control and data signals can be transferred, by means of a connection line, to a remote station 16. e.g. on the ocean surface.

Figure 2:
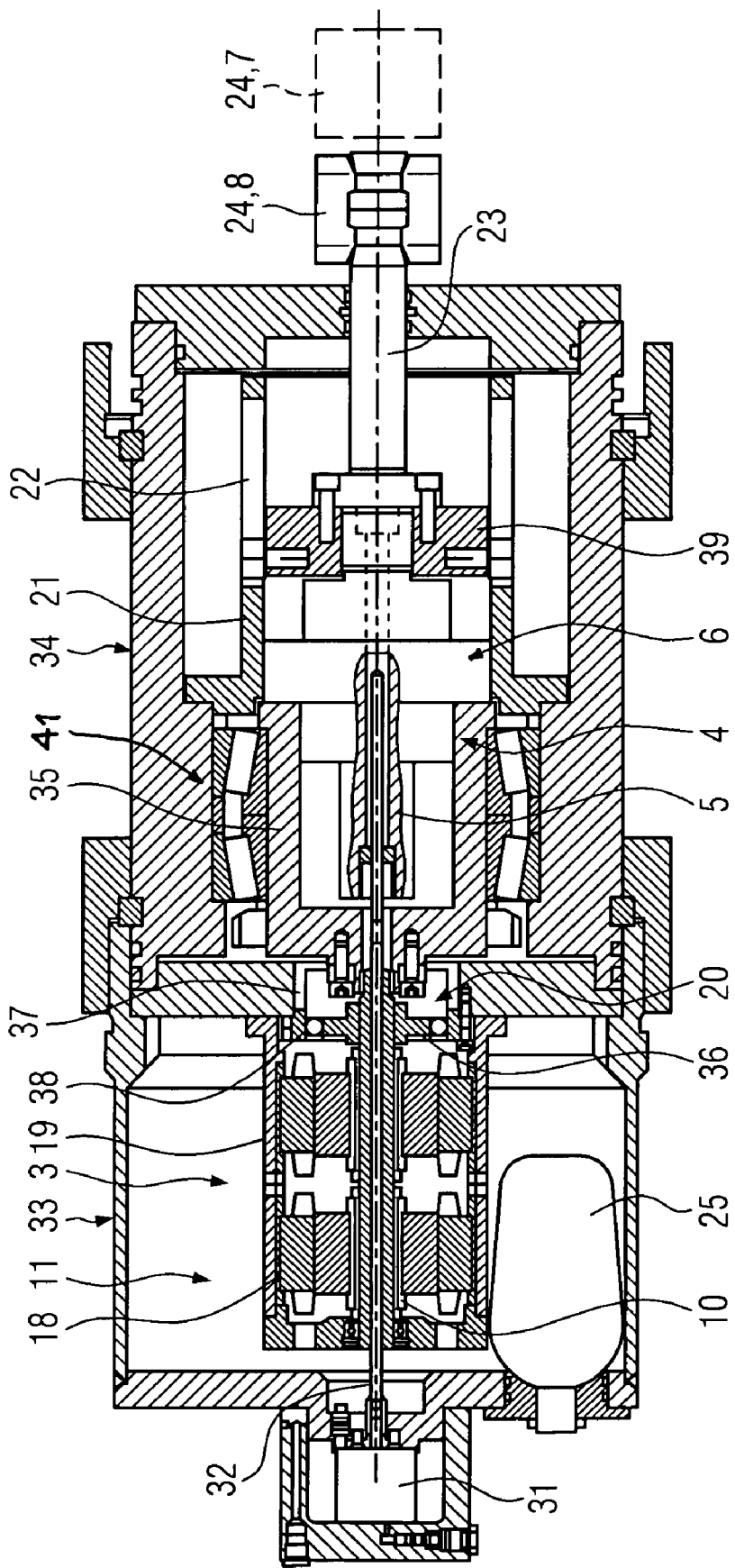
FIG. 2 shows an enlarged representation of the actuating device according to FIG. 1 without the control device.

FIG. 2 shows an enlarged representation of the actuating device 1 according to FIG. 1, in which the control device 2 is not depicted. Identical reference numerals identify identical components in all the figures and part of said reference numerals are only explained in connection with one figure.

It should here be additionally pointed out that the stem balanced gate valve 17 according to FIG. 1 is shown only exemplarily for other control devices 2. Other control devices are a gate valve without pressure compensation, a flow control valve, a blow-out preventer or other control mechanisms used in the field of natural gas and crude oil production, in particular on the sea bottom or at least below the sea level. The actuating device in question can, however, also be used for non-maritime units of the type in question.

FIG. 2 shows in particular the coupling element 24 at the advanced position 7, said position applying analogously also to the threaded spindle extension 23, the connection element 39 or the threaded spindle 5.

The thread drive 4 comprises the threaded spindle 5 and the screw nut 6; the screw nut 6 is connected to the connection sleeve 35 such that it is secured against rotation relative thereto, said connection sleeve 35 being rotatable relative to the housing component 34 via the rotary bearing means 41. The screw nut 6 is rotatable in the interior of the sleeve 21.

Also the gear mechanism 20 is shown in an enlarged representation in FIG. 2 so that it can be seen more clearly how the wave generator 36, the flexspline 37 and the cylindrical circular spline 38 co-operate.

The motor shaft 10 is acted upon by the two individual electric motors 18, 19 in the form of brushless dc motors. When the threaded spindle 5 occupies an attained position, at which it is subjected to pressure or traction forces especially from the control device 2, these pressure or traction forces will be compensated by a holding current of the electric motor 11 comprising the individual electric motors 18 and 19. When the threaded spindle 5 is to be retracted from the attained position, the holding current will first be reduced and subsequently the threaded spindle 5 will, according to requirements, be moved away from the attained position by the electric motor 11. It is, however, also possible that, in the case of an application of suitable pressure or traction forces through the control device 2, in a condition in which the electric motor 11 is powerless, i.e. when the holding current has been reduced, the threaded spindle 5 will automatically be moved away from the attained position. This will be of advantage especially in cases where an unintentional power interruption no longer allows the electric motor 11 to operate, so that it will nevertheless be possible to move the threaded spindle 5 away from the attained position and to allow thus e.g. a closing of the valve. If the threaded spindle 5 is, however, not acted upon by such pressure or traction forces, cf. e.g. the stem balanced gate valve 17 according to FIG. 1, it will in this case remain at its attained position.

The electric motor 11 and the respective holding current serve in this connection as a position holding means 9.

What is not shown in FIG. 2 is an alternative embodiment of such a position holding means 9, which is substantially independent of the electric motor 11. Such a position holding means 9 is e.g. a motor shaft blocking means, such as a lock, a brake or the like, which acts directly onto the motor shaft 10. This motor shaft blocking means can be electrically operable. By releasing the lock or brake, it will then be possible to move the threaded spindle 5 away from the respective attained position. Such an attained position is, e.g. in the case of a gate valve without pressure compensation, an open position of the valve which results from a displacement of the threaded spindle 5 to the advanced position 7. It is, however, also possible that the open position of the valve is obtained by displacing the threaded spindle 5 to the retracted position 8; in this case, the threaded spindle will essentially have applied thereto traction forces, instead of pressure forces, by means of the control device 2.

Figure 3:
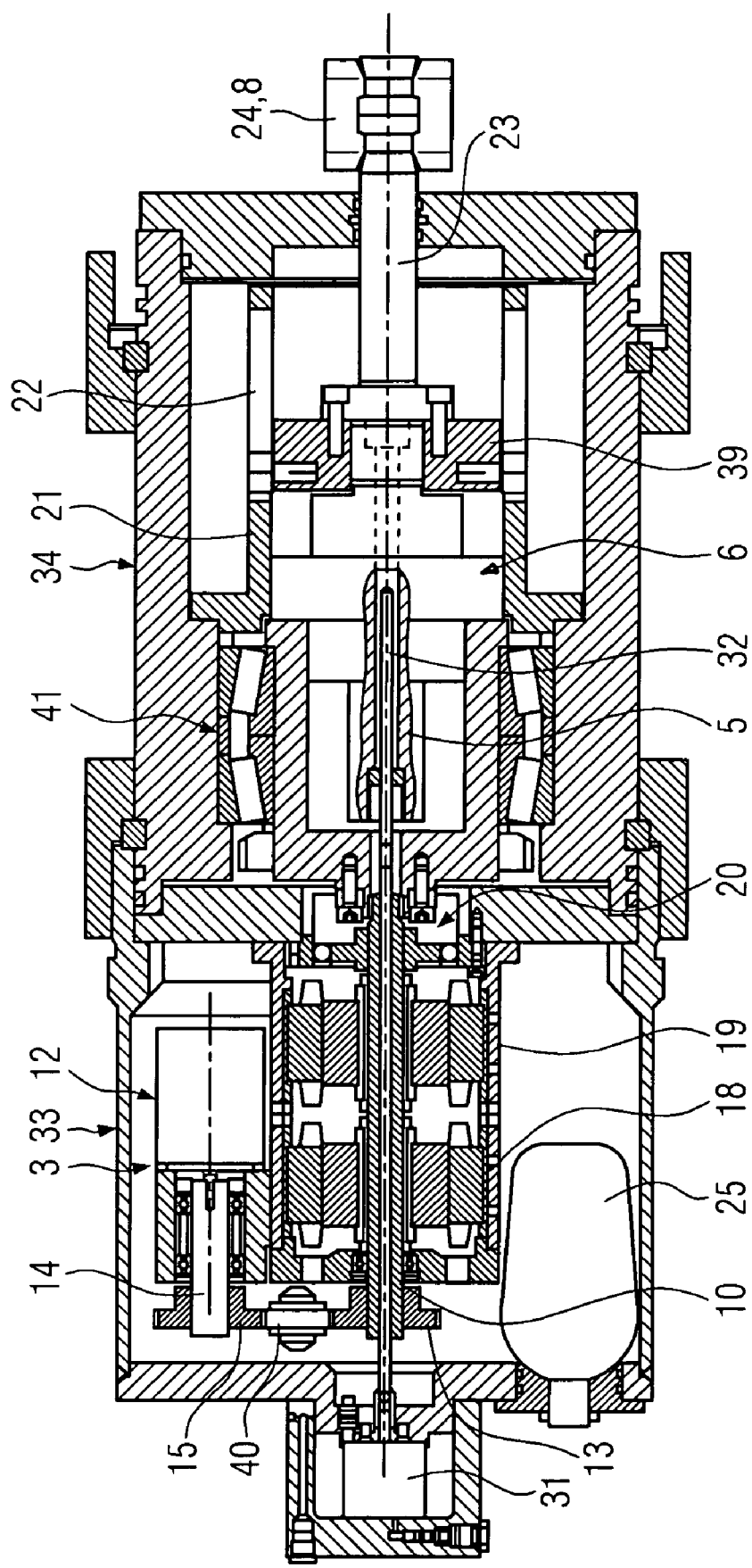
FIG. 3 shows a longitudinal section, corresponding to FIG. 2, of a second embodiment of an actuating device according to the present invention.

FIG. 3 shows a second embodiment of an actuating device 1; this representation corresponds to the representation according to FIG. 2. The only difference between the embodiments is a realization of the position holding means 9 by a stepping motor 12. A suitable holding torque acting directly on the motor shaft 10 so as to maintain the attained position of the threaded spindle 5 can in this case, just as in the case of the motor shaft blocking means, be applied by the stepping motor 12 and by the motor shaft blocking means, respectively, when the electric motor 11 is currentless.

The stepping motor 12 is arranged in parallel spaced relationship with the motor shaft 10. On a motor shaft end, which faces away from the gear mechanism 20, a first gear 13 is arranged such that it is secured against rotation relative thereto. This gear 13 is in engagement with a second gear 15 via an intermediate gear 40. The second gear 15 is arranged on a stepping motor shaft 14 such that it is secured against rotation relative thereto. The rotation of the motor shaft 10 for displacing the threaded spindle 5 to the respective attained position is realized by actuating the electric motor 11. The holding torque acting on the motor shaft 10 is, however, directly applied by the stepping motor 12 via respective gears. Only when this stepping motor 12 has been actuated, the holding torque can be reduced and the threaded spindle 5 can be moved away from the attained position.

In the following, the mode of operation of the actuating device according to the present invention will be explained briefly on the basis of the figures.

In the case of the actuating device according to the present invention, it is in no way necessary to compress a volute spring or a loop spring during the displacement of the threaded spindle, or to release such a spring e.g. for returning the threaded spindle to the retracted position. Instead, the actuating device is able to transmit traction as well as pressure forces to the respective control device. When the threaded spindle occupies the attained position, it will be held by a holding torque at this position. This holding torque can be generated e.g. by a suitable holding current of the electric motor. Alternatively, it will be generated by the stepping motor or by the motor shaft blocking means. In the two latter cases, the electric motor will be powerless.

The holding torque prevents an automatic displacement of the threaded spindle from the attained position.

If, for example, a valve which acts as a control device and which is open in the attained position of the threaded spindle is to be closed, the power supply to the electric motor will e.g. be interrupted and the holding torque will consequently be reduced. This applies analogously to the stepping motor and to the motor shaft blocking means.

If a respective fluid pressure in the pipeline 30, cf. FIG. 1, should be higher than the ambient pressure of the valve slide, the valve will be closed automatically, when the holding torque has been reduced. In the case of this automatic closing, it is possible to operate the electric motor 11 in a generator mode and to use the power generated e.g. for transmitting a signal to the remote station 16. The generator mode will also have the effect that the closing speed of the valve will be reduced to an acceptable speed.

The power generated can, e.g. in the case of an unintentional interruption of the power supply to the electric motor and the actuating device 1, respectively, be used for transmitting this message, provided that at least one line to the remote station 16 is still intact.

If the pressure in the pipeline 30 is, however, not higher than the ambient pressure, i.e. in particular not higher than the hydraulic pressure acting on the piston rod of the valve slide, an automatic resetting of the valve slide and, consequently, of the threaded spindle 5 will not take place; this applies especially to a stem balanced gate valve. In this case, the valve slide must actively be displaced to the closed position by the electric motor 11 by means of a displacement of the threaded spindle 5. This will, however, not be possible when the power supply to the actuating device has been interrupted completely. In this case, the valve will remain at the open position.

Another special advantage of the use of a stem balanced gate valve is that the actuating device 1 only has to overcome the respective frictional forces, but not additional hydraulic forces, such as the borehole pressure or the hydrostatic pressure.

Advantages of the actuating device according to the present invention are the reduction of the number of individual components and the compact design. In addition, the actuating device will be less expensive for these reasons, and it can be arranged more easily e.g. on the respective control device at the tree or the like.

While the invention may be susceptible to various modifications and alternative forms, specific embodiments have been shown by way of example in the drawings and have been described in detail herein. However, it should be understood that the invention is not intended to be limited to the particular forms disclosed. The invention is to cover all modifications, equivalents, and alternatives falling within the spirit and scope of the invention as defined by the following appended claims. Additionally, usage of the term "present invention" or "invention" generally refers to exemplary embodiments of the claimed invention and, as such, subsequent descriptors are not necessarily requirements for every embodiment encompassed by the claims of this application.

The invention claimed is:

1. An actuating device for displacing a control device, comprising:
   a motor-gear unit;
   a threaded spindle drive operable by the motor-gear unit and comprising a threaded spindle and a screw nut, wherein the threaded spindle is displaceable in an essentially axial direction so as to displace the control device between an advanced position and a retracted position: and
   a position holding means holding an attained position of the threaded spindle,
   wherein the position holding means is directly connected to a motor shaft of the motor-gear unit so as to apply a holding torque to the motor shaft.

2. The actuating device according to claim 1, wherein the threaded spindle drive is a roller bearing spindle drive.

3. The actuating device according to claim 1, wherein the position holding means is an electric motor of the motor-gear unit, operated with a holding current.

4. The actuating device according to claim 1, wherein the position holding means is a stepping motor which is connected to the motor shaft in a motion-transmitting manner.

5. The actuating device according to claim 1, wherein a first gear is disposed on the motor shaft and in engagement with a second gear disposed on a stepping motor shaft, so as to establish a motion-transmitting connection between the motor shaft and the stepping motor.

6. The actuating device according to claim 1, wherein the position holding means is a motor shaft blocking means.

7. The actuating device according to claim 6, wherein the motor shaft blocking means is electrically operable.

8. The actuating device according to claim 3, wherein, when the threaded spindle is returned from the attained position, the electric motor is configured to switch to a generator mode for generating power.

9. The actuating device according to claim 8, wherein the electric motor operated in the generator mode can be used for transmitting a signal to a remote station.

10. The actuating device according to claim 3, wherein the electric motor is a brushless dc motor.

11. The actuating device according to claim 1, wherein, for displacing the control device, the threaded spindle is configured to move between the advanced position and the retracted position in a traction direction and between the retracted position and the advanced position in a pressure direction.

12. A method of operating an actuating device for displacing a control device, wherein the actuating device comprises a motor-gear unit, a threaded spindle drive operable by the motor-gear unit and comprising a threaded spindle and a screw nut, and a position holding means, the method comprising:
- displacing the control device by means of the threaded spindle between an advanced position and a retracted position,
- with the position holding means, applying a holding torque directly to the motor shaft of the motor-gear unit to hold the threaded spindle at an attained position by the position holding means,
- reducing the holding torque to release the position holding means to reset the threaded spindle from the attained position.

13. The method according to claim 12, wherein the holding torque is applied by a holding current of an electric motor of the motor-gear unit, and wherein the holding current acts against a resetting force of the control device.

14. The method according to claim 12, wherein the holding torque is applied by a stepping motor connected to the motor shaft in a motion-transmitting manner.

15. The method according to claim 12, wherein the holding torque is applied by an electrically operable motor shaft blocking means connected to the motor shaft.

16. The method according to claim 13, wherein the holding torque is reduced by reducing the holding current and operating the electric motor in a generator mode so as to generate power.

17. The method according to claim 12, further comprising:
- when the holding torque has been reduced, reducing a displacement speed of the threaded spindle.

18. The method according to claim 16, further comprising:
- transmitting information to a remote station by means of the power generated by the electric motor operated in the generator mode.

19. The method according to claim 13, further comprising:
- resetting the threaded spindle by the electric motor when no pressure or traction forces are applied by the control device in the resetting direction of the threaded spindle.

20. The method according to claim 12, further comprising:
- letting the threaded spindle and the motor shaft remain at the attained position when a power supply to the actuating device fails.

21. The method according to claim 12, further comprising:
- displacing the control device, which is pressure-compensated in the direction of displacement of the threaded spindle, by displacing the threaded spindle by means of the motor shaft.

* * * * *